United States Patent [19]

Nikkel et al.

[11] Patent Number: 4,465,057

[45] Date of Patent: Aug. 14, 1984

[54] COLLECTOR MEANS FOR SOLAR ENERGY COLLECTING SYSTEM

[75] Inventors: Ronnie D. Nikkel; Paul M. L'Esperance, both of Bartlesville, Okla.

[73] Assignee: Phillips Petroleum Company, Bartlesville, Okla.

[21] Appl. No.: 507,397

[22] Filed: Jun. 24, 1983

[51] Int. Cl.³ .............................................. F24J 3/02
[52] U.S. Cl. .................................... 126/418; 126/426; 126/438; 126/450
[58] Field of Search ............... 126/417, 418, 426, 429, 126/432, 438, 439, 443, 444, 445, 446, 447, 450, 451

[56] References Cited

U.S. PATENT DOCUMENTS

| | | | |
|---|---|---|---|
| 3,943,911 | 3/1976 | Yu | 126/432 |
| 4,043,317 | 8/1977 | Scharfman | 126/422 |
| 4,257,396 | 3/1981 | Reinert | 126/429 |
| 4,263,893 | 4/1981 | Pavlak | 126/438 |
| 4,284,059 | 8/1981 | Thomason | 126/426 |
| 4,345,585 | 8/1982 | Ellis | 126/429 |
| 4,355,682 | 10/1982 | Maloney | 126/426 |
| 4,402,305 | 9/1983 | Kremen | 126/426 |
| 4,407,267 | 10/1983 | Heden | 126/450 |
| 4,418,685 | 12/1983 | Frazier | 126/450 |
| 4,419,982 | 12/1983 | Eckels | 126/426 |

Primary Examiner—Daniel J. O'Connor

[57] ABSTRACT

In accordance with the present invention, an improved collector means for a solar energy collector system having an absorber plate and a glazing panel spaced from at least one side of the absorber plate in which a cap means is coupled to and extends along one edge of the absorber plate and a depending leg extends over the complimentary edge of the glazing panel, the cap means having formed therein at least one air channel conforming in shape to the cross-sectional shape of the cap means and having air inlet means adjacent the bottom of a leg of the cap means in communication with the channel and an air outlet means adjacent the top of the cap means and in communication with the channel and adapted to permit currents of cooling air to pass therethrough from the inlet to the outlet, thereby maintaining said complimentary edge of the glazing panel relatively cool. In a preferred embodiment, the improved collector means is mounted edgewise adjacent the bottom of a parabolic trough-type reflector means and has a glazing panel on both exposed sides thereof. In accordance with a further embodiment of the present invention, the glazing panel is a flexible sheet material detachably coupled adjacent one edge of the absorber plate and the other end of a glazing material comprises a supply roll mounted adjacent the other edge of the absorber plate, whereby a fresh surface of glazing sheet material can be withdrawn from the roll and mounted parallel to the absorber plate as needed. Preferably, the roll of glazing sheet material is spring loaded so as to maintain the material taut, for example by a window shade-type roll means.

8 Claims, 4 Drawing Figures

COLLECTOR MEANS FOR SOLAR ENERGY COLLECTING SYSTEM

The present invention relates to solar energy collecting systems and particularly to solar energy collecting systems of the non-tracking, focused type. More particularly, the present invention relates to an improved collecting means for solar energy collecting systems.

BACKGROUND OF THE INVENTION

Broadly, solar energy collecting systems include a collecting means which receives the solar energy and converts it to a useful form. In most energy collecting systems a receiving, focusing or reflecting means of some type receives the sun's rays from a predetermined extended area and directs the received solar energy to a collector means of some type which, in turn, receives the initial energy in an enhanced or concentrated form, specifically at a much higher degree of heat per unit area than originally received by the receiving means. The collector means utilizes the energy which it receives to heat a fluid, such as air or water, directly for immediate use or stores the same in a heat sump or heat reservoir for ultimate use on demand. The heat energy received by the collector may also be converted to electrical energy for immediate use or converted to electrical energy and stored in storage devices or batteries for ultimate use on demand.

Most solar energy systems, in use or proposed for use, have been of the type in which an extended reflecting surface receives the solar energy and directs it to a substantially smaller collector means. Such reflecting surfaces may also take a wide variety of forms. For example, flat, dished, parabolic troughs, etc. The system may also be of the tracking or nontracking type, which, to a great extent, depends upon the receiving surface. For example, flat receiving surfaces or reflecting surfaces need to be oriented at all times according to the position of the sun in order to receive sufficient energy. Thus, such systems are so-called tracking systems when the receiving surface tracks the movement of the sun from horizon to horizon on a daily basis and, preferably, the azimuthal position of the sun on a seasonal basis. While tracking on a seasonal basis can be performed manually, it is wholly impractical to manually track the sun on a daily basis. Accordingly, automatic tracking systems are provided. Such tracking systems are complex and expensive to operate and maintain. By contrast, a parabolic trough-type receiving means can be utilized as a so-called nontracking system. By appropriately shaping the parabola, sizing and positioning a collector within the parabola so as to receive substantially all of the energy striking and reflected by the inner reflecting surface of the parabola and correctly positioning the reflector surface in a generally east-west direction, it is unnecessary to track on a daily basis and all that is required for maximum efficiency is changing the orientation several times, for example, two to four times per year, to accommodate seasonal changes of the positions of the sun.

The collector means for solar energy systems either receives solar rays directly, or as previously pointed out, indirectly from a receiving, focusing or reflecting means. The basic component of the collecting means comprises an absorber means which is generally a panel or plate-type device adapted to absorb the collected solar energy and convert it to an immediately useful form or a form which can be stored for use on demand. For this purpose, the absorber means is constructed of a material adapted to absorb the heat and, to the extent possible, retain the absorbed heat, often being a black body or a body having a coating of black paint as opposed to a reflective body. In a majority of instances the absorber means is a flat plate-type heat exchanger. Heat exchange is carried out by forming fluid passages such as rectangular ducts, tubular ducts and the like through which a heat exchange medium is flowed. In order to shield or insulate the exposed side or sides of the absorber means against heat losses through conduction and convection and/or cooling by the wind, it is conventional practice to mount a transparent plate or sheet adjacent the exposed side of the absorber plate and spaced therefrom so as to form an essentially dead air space between the absorber plate and the shielding plate. Thus, the shielding or insulating plate will transmit solar energy therethrough to the absorber plate, while at the same time preventing direct contact by the wind, and heat losses from the absorber plate by conduction and convection. Generally, the shielding or insulating plate is a polymeric material of some type such as polyethylene, polyvinylchloride, etc. and may be in the form of a rigid or semirigid plate or a flexible sheet material. Regardless of the structure of the shielding or insulating panel or panels, the most serious problem encountered is rapid deterioration of the panels, usually because of the high degree of heat concentrated in the absorber plate and the mounting which requires some connection between the absorber plate and the shielding panel. Thus, there is the need for frequent replacement. Hence, it is necessary that the shielding or insulating panel be mounted so as to not contact the absorber plate. However, regardless of the manner of mounting, there is still the problem of the shielding panel eventually deteriorating and requiring replacement because of radiated heat and conducted heat through the connecting means. This is particularly true in the case of panels of flexible polymeric materials. While such panels are usually stretched taut and are often of material which will shrink to thus further tighten the same, there is still a tendency for the wind to force the material into contact with the absorber plate or for the material to lose its resiliency and sag into contact with the absorber plate. Thus, it is highly desirable that some means of maintaining the shielding or insulating panel, often referred to as "glazing", relatively cool, preventing contact with the absorber plate and providing some means for rapidly replacing deteriorated panels.

SUMMARY OF THE INVENTION

Figure 1:
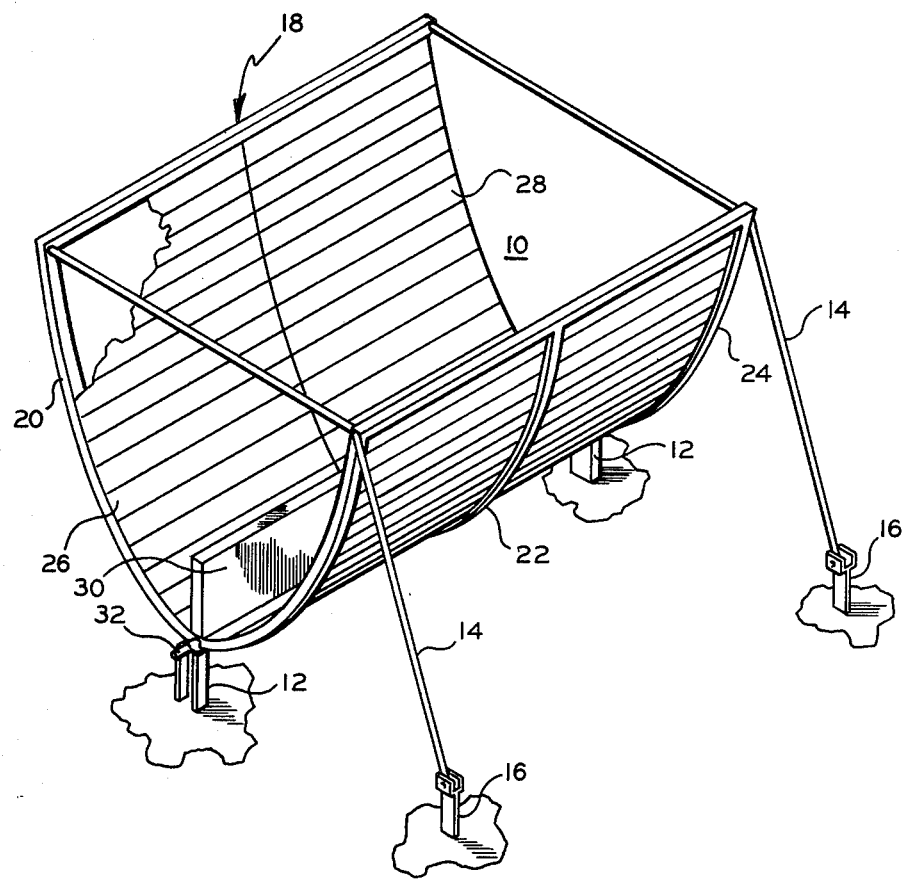
FIG. 1 is a perspective view, partially in section, of a solar energy collector system in accordance with one embodiment of the present invention.

It is therefore an object of the present invention to provide an improved solar energy collecting system which overcomes the above-mentioned and other problems of the prior art. Another object of the present invention is to provide an improved collector means for a solar energy collection system which overcomes the above-mentioned and other problems of the prior art. Yet another object of the present invention is to provide an improved collector means for a solar energy collector system which is relatively inexpensive to manufacture and install. A further object of the present invention is to provide a collector means for a solar energy collector system, including at least one glazing or insulating panel. Another and further object of the present invention is to provide a collector means for a solar energy collector system in which deterioration of an insulating or glazing panel is reduced. Yet another object of the present invention is to provide a collector means for a solar energy collector system in which an insulating or glazing panel is maintained relatively cool. Yet another object of the present invention is to provide an improved collector means for a solar energy collector system having an improved insulating or glazing panel of flexible material. A still further object of the present invention is to provide an improved collector means for a solar energy collector system which can be readily mounted within the collector means. Another and further object of the present invention is to provide an improved collector means for a solar energy collector system in which an insulating or glazing panel can be readily replaced in the event of deterioration. These and other objects and advantages of the present invention will become apparent from the following description.

In accordance with the present invention, an improved collector means for a solar energy collector system, having an absorber plate and a glazing panel spaced from at least one side of the absorber plate, is provided in which a cap means having a depending leg is coupled to and extends along one edge of the absorber plate and extends over the complimentary edge of the glazing panel, the cap means having formed therein at least one air channel conforming in shape to the cross-sectional contour cap means and having air inlet means adjacent the bottom of the leg of the cap means in communication with the channel and an air outlet means adjacent the top of the cap means and in communication with the channel and adapted to permit currents of cooling air to pass therethrough from the inlet to the outlet, thereby maintaining said complimentary edge of the glazing panel relatively cool. In a preferred embodiment, the improved collector means is U-shaped and is mounted edgewise adjacent the bottom of a trough-type reflector means and has a glazing panel on both exposed sides thereof. In accordance with a further embodiment of the present invention, the glazing panel is a flexible sheet material detachably coupled adjacent one edge of the absorber plate and the other end of the glazing material comprises a supply roll mounted adjacent the other edge of the absorber plate, whereby a fresh surface of glazing sheet material can be withdrawn from the roll and mounted parallel to the absorber plate as needed. Preferably, the roll of glazing sheet material is spring loaded so as to maintain the material taut, for example by a window shade-type roll means.

DETAILED DESCRIPTION OF THE PREFERRED EMBODIMENTS

The nature and advantages of the present invention will be better understood by the following description when read in conjunction with the drawings.

FIG. 1 of the drawings illustrates a preferred solar energy collector system, in accordance with the present invention, which comprises a parabolic trough-type reflecting surface which can be fixedly installed in a generally east-west direction to provide a nontracking system. As previously indicated, better year around efficiency can be attained by adjusting the reflector surface several times per year, for example, two to four times per year, to compensate for changes in the position of the sun due to seasonal changes. The general design, structure, installation and operation of this type of system is disclosdd in greater detail in U.S. Pat. Nos. 4,024,852 and 4,263,892, which are incorporated herein by reference, and other such details are known to those skilled in the art.

In accordance with FIG. 1, a parabolic trough-shaped extended reflector surface 10 is mounted on legs 12, which are, of course, anchored, as in concrete. Further anchoring is provided by struts or guy wires 14, which are in turn attached to anchors 16, also mounted in concrete or other foundation material. Reflector surface 10 is made up of an open frame member 18, which defines the perimeter of the reflective surface and includes a plurality of curved supports 20, 22, and 24 of semi-parabolic curvature. Mounted between supports 20 and 22 of frame means 18 are a plurality of elongated, flexible strips of reflective material. Strips 26 are mounted in parallel relationship to one another and lengthwise with respect to the parabolic trough, so as to form an essentially continuous reflector surface. The parallel relationship of strips 26 may be abutting or overlapping, as necessary or desired. A like plurality of reflector strips 28 are mounted between supports 22 and 24. Mounted along the bottom center of parabolic trough 10 is a collector means 30. Reflecting surface 10 is preferably mounted on support legs 12 through end rods 32, which permit rotation of the system to compensate for seasonal variations in the location of the sun.

Figure 2:
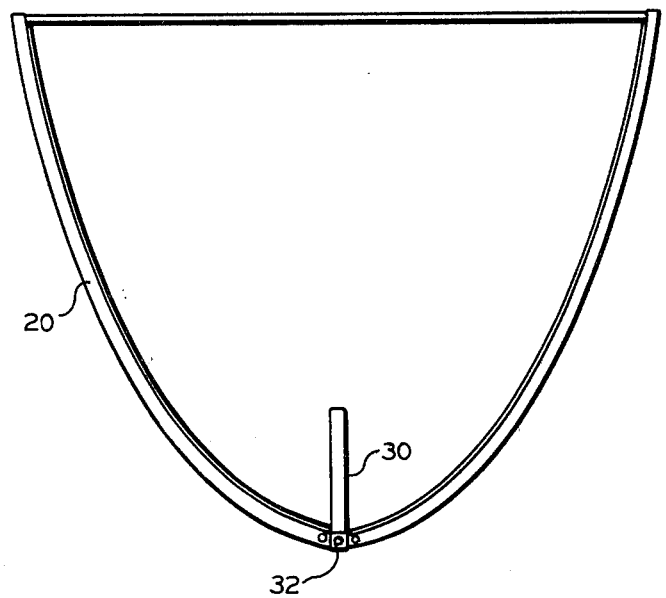
FIG. 2 is an end view of the system of FIG. 1.

FIG. 2 is an elevational end view of the system of FIG. 1.

Figure 3:
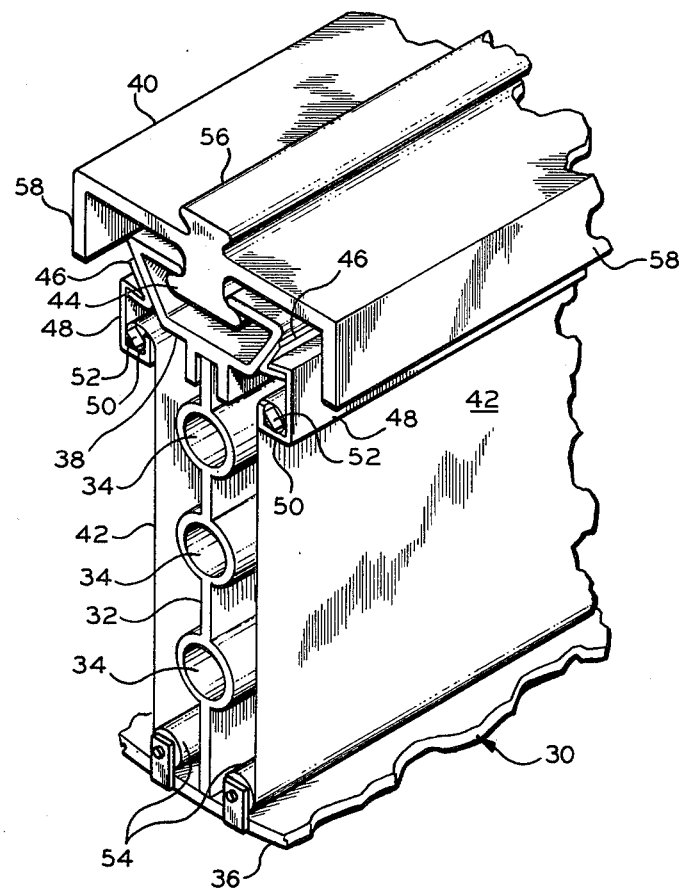
FIG. 3 is a perspective view, partially in section, of an improved collector means in accordance with the present invention.

FIG. 3 of the drawings is an isometric view, partially in section, of the improved collector means 30 of the present invention. Collector means 30 includes absorber plate means 32, which, as indicated previously, is preferably mounted edgewise or in an upstanding manner adjacent the bottom of a parabolic trough-type reflector. Formed in absorber plate 32 are tubular passages 34 for carrying a heat exchange fluid, such as air or water. Tubular passages 34 may be appropriately manifolded at the ends thereof so that heat exchange medium may be flowed therethrough. Absorber plate 32 is made of a heat absorbing material, for example, may be extruded or pultruded from aluminum. The bottom edge of absorber plate 32 is fixedly attached to a base 36 which preferably is a section of parabolic trough 10 (FIG. 1). Fixedly mounted to the top edge of absorber plate 32 is a mounting channel 38. Mounting channel 38 provides means for mounting cap means 40 and glazing sheets 42. As illustrated, cap means 40 is provided with a downwardly extending rib 44, which slides into a slot in mounting channel 38. In accordance with one embodiment of the present invention, glazing panels 42 are a transparent, flexible sheet material, such as polyethylene film. By utilizing a thin film, the cost of construction can be substantially reduced and, as hereinafter pointed out, the surfaces of the glazing panels may be readily replaced. For example, a polyethylene film approximately 5 mils thick will generally have a strength in the range of about 20,000 to about 40,000 psi, which when properly mounted and maintained, adequately serves the purposes of a glazing panel. In order to mount glazing panels 42, V-shaped channels 46 are fixedly mounted onto the sides of mounting channel 38. V-shaped channels 46 need not extend the entire length of the unit, but may be spaced at appropriate points along the length. Alternatively, tabs may be punched from mounting channel 38 to provide a plurality of V-shaped supports. Hooked into channels 46 are support channels 48 which terminate at the lower ends in a U-shaped receiving channel 50. The upper end of the glazing panel 42 is detachably mounted in receiving channels 50. As illustrated, the glazing sheet 42 is simply wrapped around rectangular rods 52, which fit into channels 50 in such a manner that they will become wedged in channels 50 when a downward tension is applied to glazing sheet 42. The glazing sheet 42 is simply wrapped around the rods 52. The lower ends of glazing panels 42 terminate in rolls or glazing panel material mounted on spring-loaded window shade-type rollers 54. Rollers 54 keep glazing panels 42 taut at all times. However, should a portion of or all of glazing panels 42 deteriorate, the upper ends of the panels may simply be removed from the channels 50, the deteriorated portion removed, if necessary, a fresh surface mounted on rods 52 and the rods reinserted in channels 50. Thus, the structure explained not only maintains the glazing panels 42 taut at all times but also provides ready replacement of the surfaces thereof. While the cap means 40 is preferred, it is not necessary in all cases and mounting channel 38, V-shaped channels 46 and channels 48 could be replaced by an appropriate mounting means of another type. In addition, in such cases, the window shade-type rollers 54 could simply be rotatable rollers and the upper ends of glazing panels 42 could be detachably mounted on absorber plate 32 by means of a wide variety of biasing or spring-type mounting means. Cap means 40 also has formed thereon an upstanding rib means 56 whose function will be explained with reference to FIG. 4. Downwardly, depending legs 58 of U-shaped cap 40 should extend over the mounting for glazing panels 42.

Figure 4:
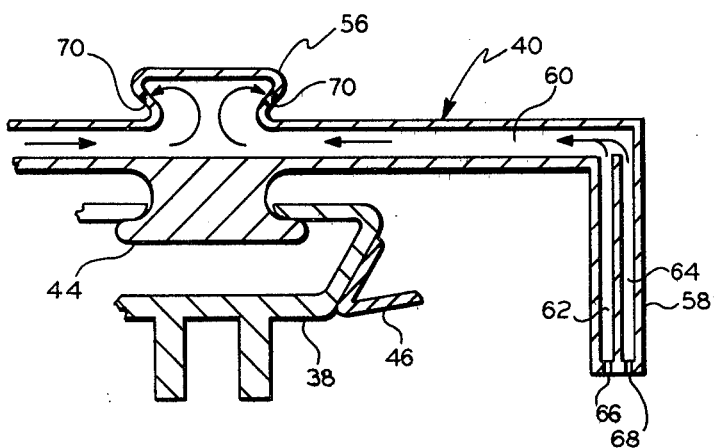
FIG. 4 is a cross-sectional view, partially in section, of the collector means of FIG. 3.

Irrespective of the manner of mounting the upper ends of glazing panels 42 to absorber plate 32, heat will be transmitted through the mounting means to the glazing panels causing damage and deterioration thereof. Accordingly, in accordance with another embodiment of the present invention, U-shaped cap means 40 provides a means of cooling the glazing panel mounting means and the upper ends of the glazing panels as illustrated in FIG. 4. Downwardly depending legs 58 of cap means 40 and the horizontal portion of the cap means 40 are hollow to provide at least one air channel 60. In the preferred embodiment, legs 58 are provided with a pair of air channels 62 and 64, respectively. Communicating with air channels 62 and 64 are air inlets 66 and 68, respectively, and communicating with air channel 60 are air outlets 70. Channels 66, 68 and 70 provide gravity thermal draft channels in cap means 40 which serve to cool the mounting means for the glazing panels and the top of the glazing panels. As temperature builds up adjacent the upper end of the glazing panels, thermal convection drafts accelerate in channel 62. As channel space 62 begins to heat up, thermal draft currents begin to flow through channel 64. Accordingly, high temperatures, which could be as high as 700° F. during stagnation, are prevented from reaching the glazing panels 42. Legs 58 of cap 40 are also preferably spaced about ¼ inch from channels 48 to allow ambient air to circulate, thus further aiding in the prevention of high temperatures reaching the glazing panels 42.

While specific materials, items of equipment, construction of equipment and modes of operation have been set forth above, it is to be understood that these specific recitals are by way of illustration and to set forth the best mode in accordance with the present invention only and are not to be considered limiting and that substitutes, equivalents, variations and modifications thereof will be apparent to one skilled in the art without departing from the present invention.

That which is claimed:

1. Collector means for a solar energy collector system including an absorber plate means having at least one side thereof exposed to solar rays, comprising:
   (a) a transparent flexible glazing sheet mounted generally parallel to the exposed side of said absorber plate and spaced therefrom;
   (b) one end of said glazing sheet being detachably coupled to said absorber plate adjacent one edge of said absorber plate.
   (c) the other end of said glazing sheet comprising a supply roll of glazing sheet material mounted adjacent the other edge of said absorber plate;
   (d) whereby fresh glazing sheet material can be withdrawn from said supply roll and mounted parallel to said absorber plate as needed; and
   (e) cap means coupled to and extending along one edge of said absorber plate and having a downwardly depending leg extending at least partially over the complimentary edge of said glazing sheet and spaced therefrom;
   (f) said cap having formed therein at least one air channel generally conforming in shape to the cross-sectional shape of said cap, including air inlet means adjacent the bottom of said leg of said cap and in communication with said air channel and air outlet means adjacent the top of said cap and in communication with said channel and adapted to permit currents of cooling air to pass therethrough from said inlet to said outlet.

2. Collector means in accordance with claim 1 wherein the absorber plate is mounted so as to expose both sides thereof to solar rays, like glazing sheets are mounted on both sides of said absorber plate and the cap is an inverted generally U-shaped cap with the depending legs thereof extending at least partially over the edges of said flexible glazing sheets.

3. Collector means in accordance with claim 1 wherein the channel includes two parallel channels in at least the depending leg portion thereof.

4. Collector means in accordance with claim 1 wherein at least one edge of the glazing sheet is spring biased to maintain said glazing sheet taut.

5. Collector means in accordance with claim 4 wherein the biasing means is a window shade-type roller supporting the supply roll.

6. Collector means in accordance with claim 1 wherein the absorber plate is mounted edgewise adjacent the bottom of a parabolic trough-type reflector means, both sides of said absorber plate are thus exposed to solar rays, like glazing sheets are mounted on both sides of said absorber plate and the cap is an inverted, generally U-shaped cap with its depending legs extending at least partially over said glazing sheets.

7. Collector means in accordance with claim 1 wherein the absorber plate is a fluid-type heat exchange means having tubular channels formed therein and adapted to carry head exchange fluid.

8. Collector means in accordance with claim 1 wherein the outside surface of the cap is reflective to solar rays.

* * * * *